No. 651,394. Patented June 12, 1900.
T. J. SLOAN.
SCREW MAKING MACHINE.
(Application filed Apr. 23, 1897.)
(No Model.) 8 Sheets—Sheet 1.

No. 651,394. Patented June 12, 1900.
T. J. SLOAN.
SCREW MAKING MACHINE.
(Application filed Apr. 23, 1897.)

(No Model.) 8 Sheets—Sheet 3.

No. 651,394. Patented June 12, 1900.
T. J. SLOAN.
SCREW MAKING MACHINE.
(Application filed Apr. 23, 1897.)
(No Model.) 8 Sheets—Sheet 5.

No. 651,394. Patented June 12, 1900.
T. J. SLOAN.
SCREW MAKING MACHINE.
(Application filed Apr. 23, 1897.)
(No Model.) 8 Sheets—Sheet 6.

No. 651,394. Patented June 12, 1900.
T. J. SLOAN.
SCREW MAKING MACHINE.
(Application filed Apr. 23, 1897.)

(No Model.) 8 Sheets—Sheet 8.

WITNESSES: INVENTOR

ATTORNEYS

THE NORRIS PETERS CO., PHOTO-LITHO., WASHINGTON, D. C.

UNITED STATES PATENT OFFICE.

THOMAS JAMES SLOAN, OF PARIS, FRANCE.

SCREW-MAKING MACHINE.

SPECIFICATION forming part of Letters Patent No. 651,394, dated June 12, 1900.

Application filed April 23, 1897. Serial No. 633,511. (No model.)

*To all whom it may concern:*

Be it known that I, THOMAS JAMES SLOAN, of the city of Paris, France, have invented Improvements in Screw-Making Machines, (for which I have obtained Letters Patent in France for fifteen years, dated August 29, 1896, No. 259,294,) of which the following is a full, clear, and exact description.

My invention relates to machines for the manufacture of screws, and is specially adapted to the manufacture of wood-screws. I have in the accompanying drawings shown by way of example, one form of my invention embodied in a machine for the manufacture of wood-screws.

In the construction illustrated the machine consists of two principal organisms—to wit, first, the carrier which serves to bring the screw-blanks up to the mechanism for cutting the screw and to remove the finished screw, and, second, the mechanism for "cutting" the screw, within which term I include also any mechanism for producing a screw, such as threading mechanism, and the cutter for giving the preliminary point to the blank.

In the accompanying drawings, Figures 1 and 1ª when taken together represent a front elevation of a wood-screw-making machine in which my invention is embodied.

I will first describe the devices for cutting the screw and the means for producing the travel of the chucks. It will be understood that the chucks are caused to travel, preferably, in a rectangular path, so that the tools for cutting the screws may be located in a straight line, the said chucks passing continuously in procession in front of the tools, so that the screw-blanks carried by the chucks may be operated upon successively by the successive tools, which are so mounted as to have a progressively-less effect upon the screw-blank, so that each tool corrects the work of its predecessor, the first tool effecting the roughing and the last tool the final finishing and polishing.

Figure 6:
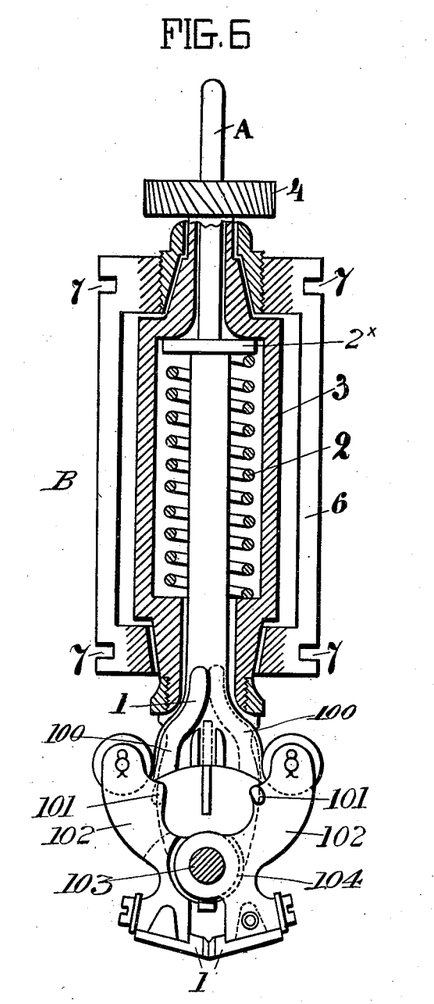
Fig. 6 is a sectional view, on a large scale, of one of the chucks for holding the blanks while they are being cut.

Referring for the present to Fig. 6, which figure shows a screw or blank carrying chuck hereinafter also called a "screw-blank carrier" and "screw-blank-carrying device or holder," 3 is a casing carried by a yoke 6, which forms part of the chuck. In the casing 3 a spring 2 is located, which bears upon a collar $2^\times$ on the spindle A, which is freely movable in the casing 3 and is provided with a pair of grooves 100, in which work studs 101, carried by jaws 102, pivoted on a pivot 103, carried by the side bars or cheeks 104 of the casing 3. The jaws 102 are adapted to be opened and closed by the descent and rise of the spindle A. It will be understood that a screw-blank is gripped between the jaws 102 of each chuck. The chucks, which will hereinafter be referred to and designated by the letter B, travel in a row along the front of the machine on guides or rails 105, which enter the slots 7 in the chucks B. At the ends of the rails 105 a transporting mechanism is provided consisting, essentially, of the pairs of rails 8, which are actuated by a link connection 9, operated by an arm 106, actuated from a segment 107, which segment 107 receives movement from a rising-and-falling rack 108, operated by the cam 50, carried upon the shaft 51. It will be observed that there are two of these transporting mechanisms, one at each end of the machine. It will thus be seen that starting from the point I the chucks will traverse a circuit and successively occupy the positions II, III, IV, V, and VI, whereupon the transporting mechanism 8 comes into action and carries the end chuck from the position VI to the position VII, where the constantly-rotating worm 10 engages in a rack or tooth 109, carried on the side of each chuck B. This constantly-rotating worm thereby causes the chuck to slide along the rails 105 from the position VII to the position VIII, where the other transporting mechanism carries it into the position I. The forward movement of the chucks along the front of the machine is produced by a pusher 14, (see Figs. 1, 1ᵃ, 2, and 2ᵃ,) which bears against the end chuck and is operated by the cam 15, which is carried on a shaft 15ᵃ, suitably driven from the main shaft C of the machine. It will be understood that the chucks bear against each other in the procession and that pushing one chuck will result in pushing the other chucks which are in front of it. The blanks are placed in the chucks when they are in the position I by the carrier shown in Figs. 1 and 2, the finished screw being first removed from the chuck by the same carrier in a manner hereinafter described.

The rotation of the chucks is effected by the worm 5, carried on a shaft 13, gearing with the gear 4 on the spindle A of the chucks. (See Fig. 3.) A small section of worm 11 receives the chucks from the transporting mechanism, and being splined onto the shaft 13 and held up to the worm 5 by the pressure of a spring 12 sets the rotatory parts of the chucks into rotation without shock.

Figures 5, 9:
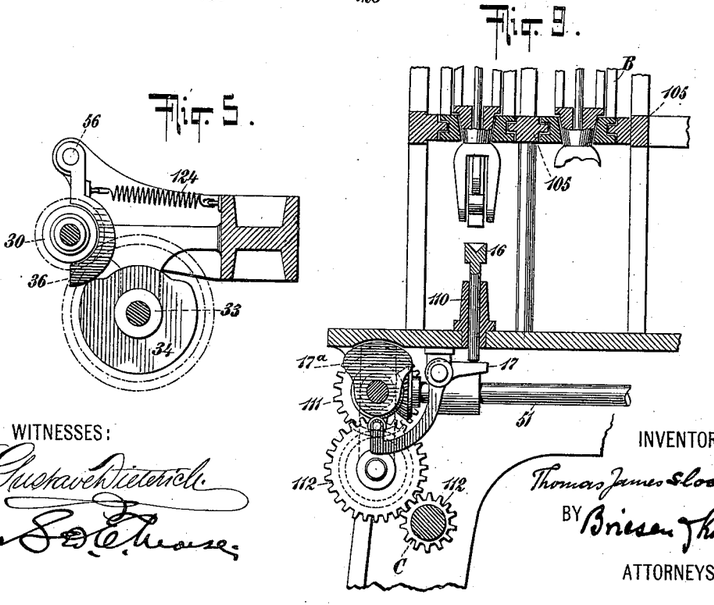
Fig. 5 is a sectional plan view of the devices for effecting a downward movement of the tool-carrying holder, the said section being taken on the line $y\ y$ of Figs. 1ª and 3.
Fig. 9 is a sectional elevation of a portion of the mechanism, the object being to clearly show the screw-pointing device.
Figure 10:
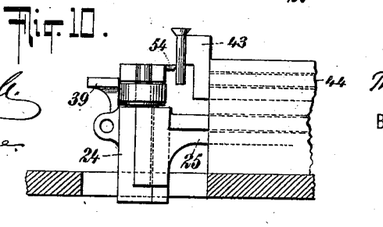
Fig. 10 is an enlarged detail elevation of the tool or screw-thread cutter and the adjacent parts.
Figure 11:
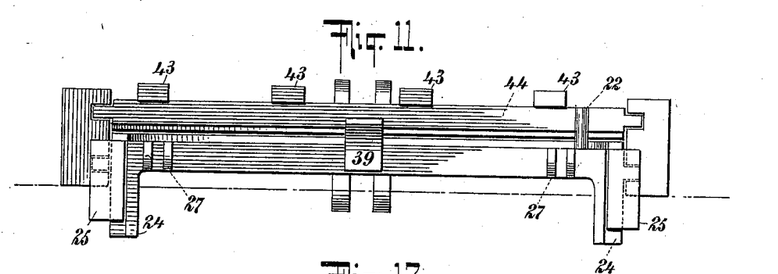
Fig. 11 is a side elevation of the slides which carry the screw-cutting devices, the tool-rest being omitted.
Figure 12:
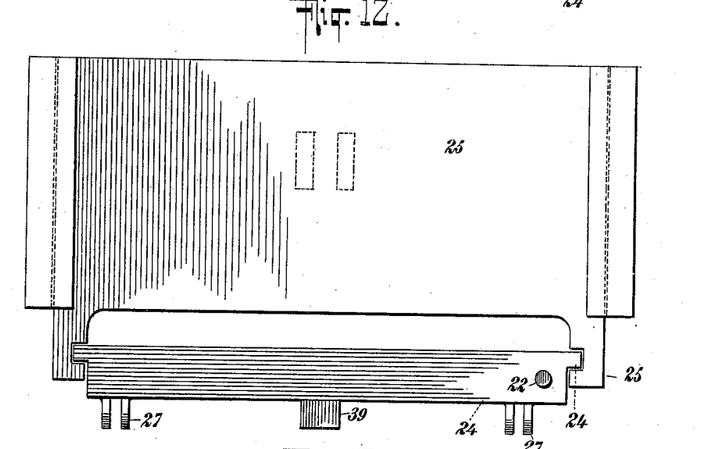
Fig. 12 is a plan thereof.
Figure 13:
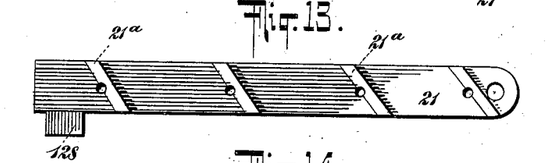
Fig. 13 is a detail plan view of the tool-rest.
Figure 14:
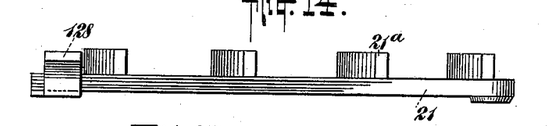
Fig. 14 is a side elevation thereof.

The mechanism for pointing the screw-blank is suitably located in the machine. This pointing mechanism is shown in the drawings as an ordinary milling-tool 16, carried upon a shaft 110, (see Fig. 9,) which is raised and lowered by an arm 17, operated upon by a cam 17ᵃ on the shaft 52, which shaft 52 is driven by a train of gears 111 and 112 from the main shaft C of the machine. The chuck is open only in the position I to deliver a finished screw and to receive a screw-blank by any suitable means. The opening of the chuck is preferably effected automatically by means of the lever 113, (see Fig. 1ᵃ,) adapted to bear upon the stem A of the chuck B, which lever 113 is actuated from a cam 115, carried on the shaft 15ᵃ. The tools for cutting the thread of the screws are marked 54 in the drawings (see Fig. 10) and are preferably made adjustable in any ordinary manner, being attached to ribs 21ᵃ on a tool-rest or carrier-bar 21, pivoted at 22 on the carriage 24.

It is important to have the tools adjustable, as unless the successive tools cut in the groove formed by their predecessor they will destroy the work of said predecessor by cutting away the fin or thread formed in the blank by their predecessor or predecessors.

The motions of the tools and tool-rest will now be described. It will be understood that the tools must receive a forward motion to bring them into contact with the blank and that they should likewise receive a downward motion, so as to cut the thread, and a templet should be provided whereby these motions are made to conform to the general profile of the screw. Some means should also be provided for retracting the tools from the work, so that after they have descended and made a cut they can ascend free from contact with the work to make a new cut.

The mechanism for producing the movements of the tools in the screw-cutting operation will now be described.

Figure 1:
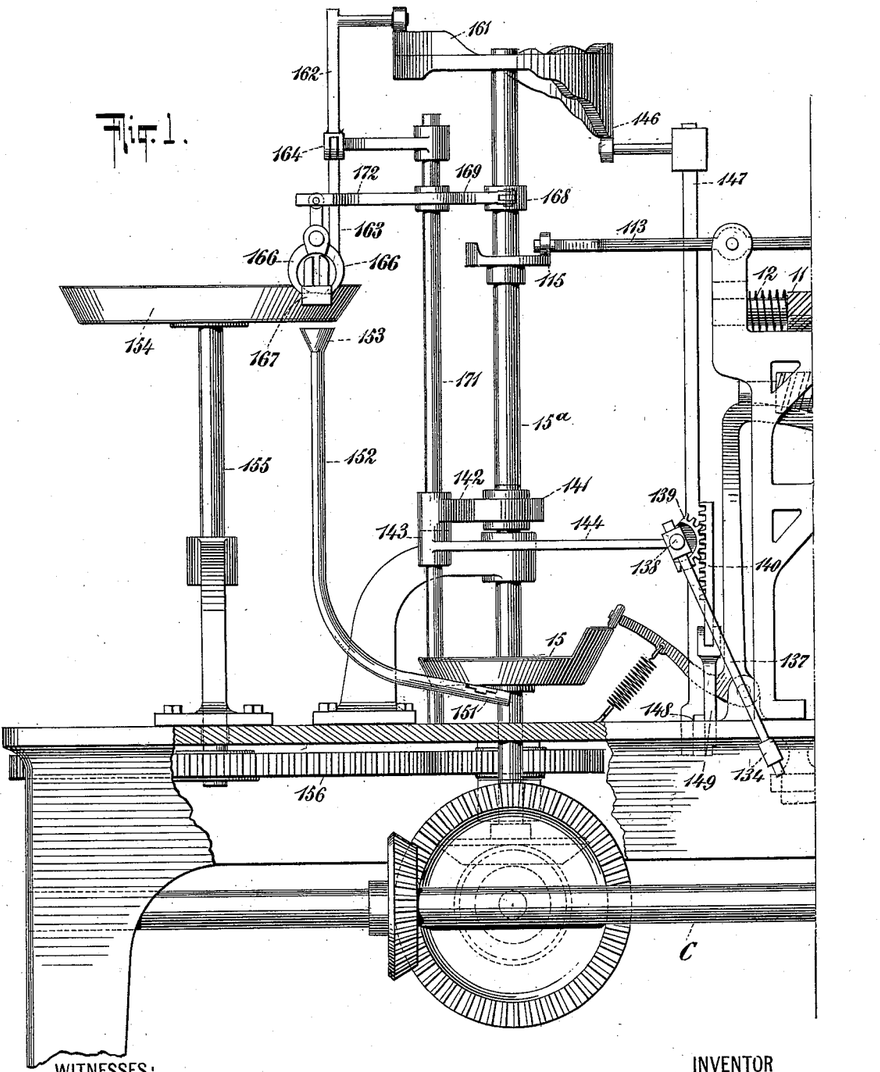
Figure 1A:
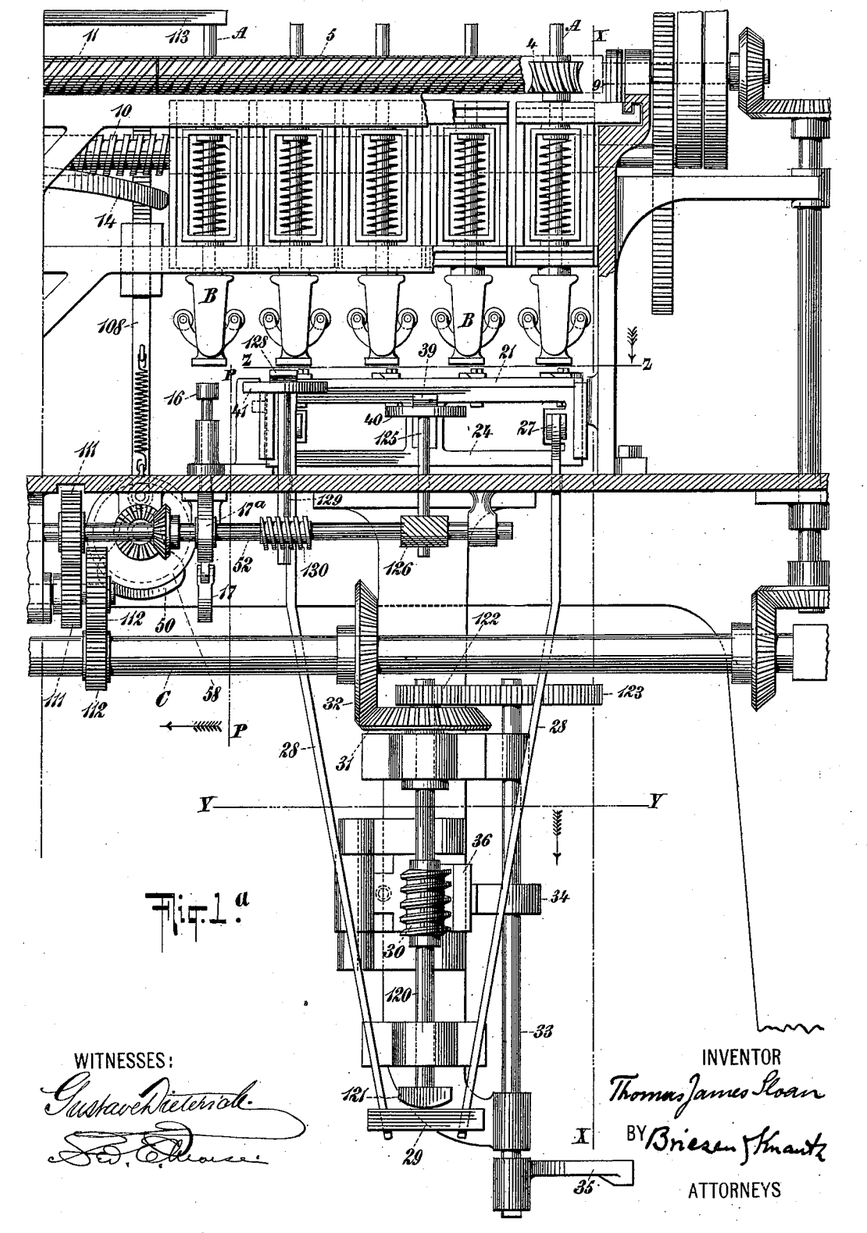
Figure 2:
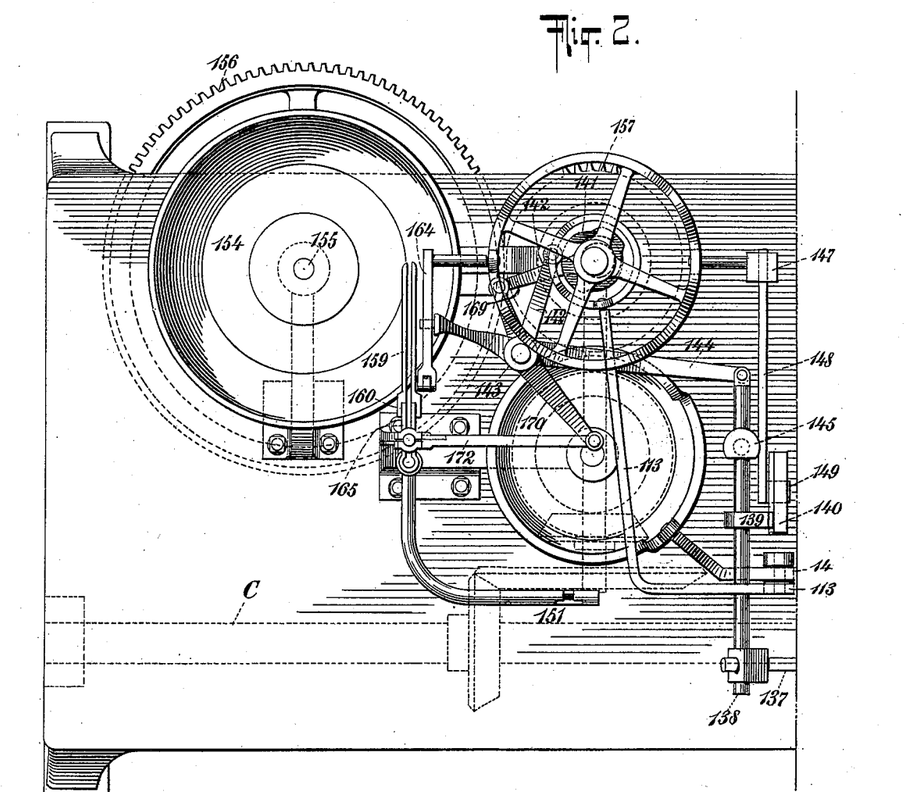
Figs. 2 and 2ª when taken together represent the said machine in plan.
Figure 2A:
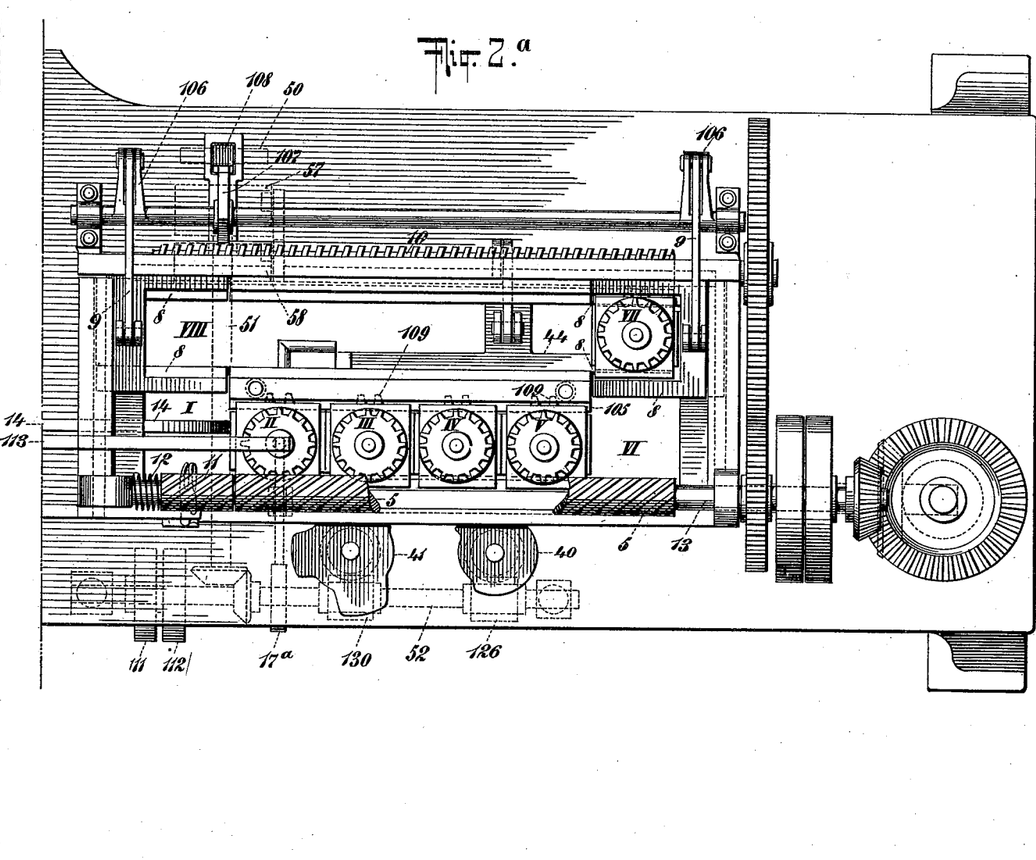
Figures 3, 8:
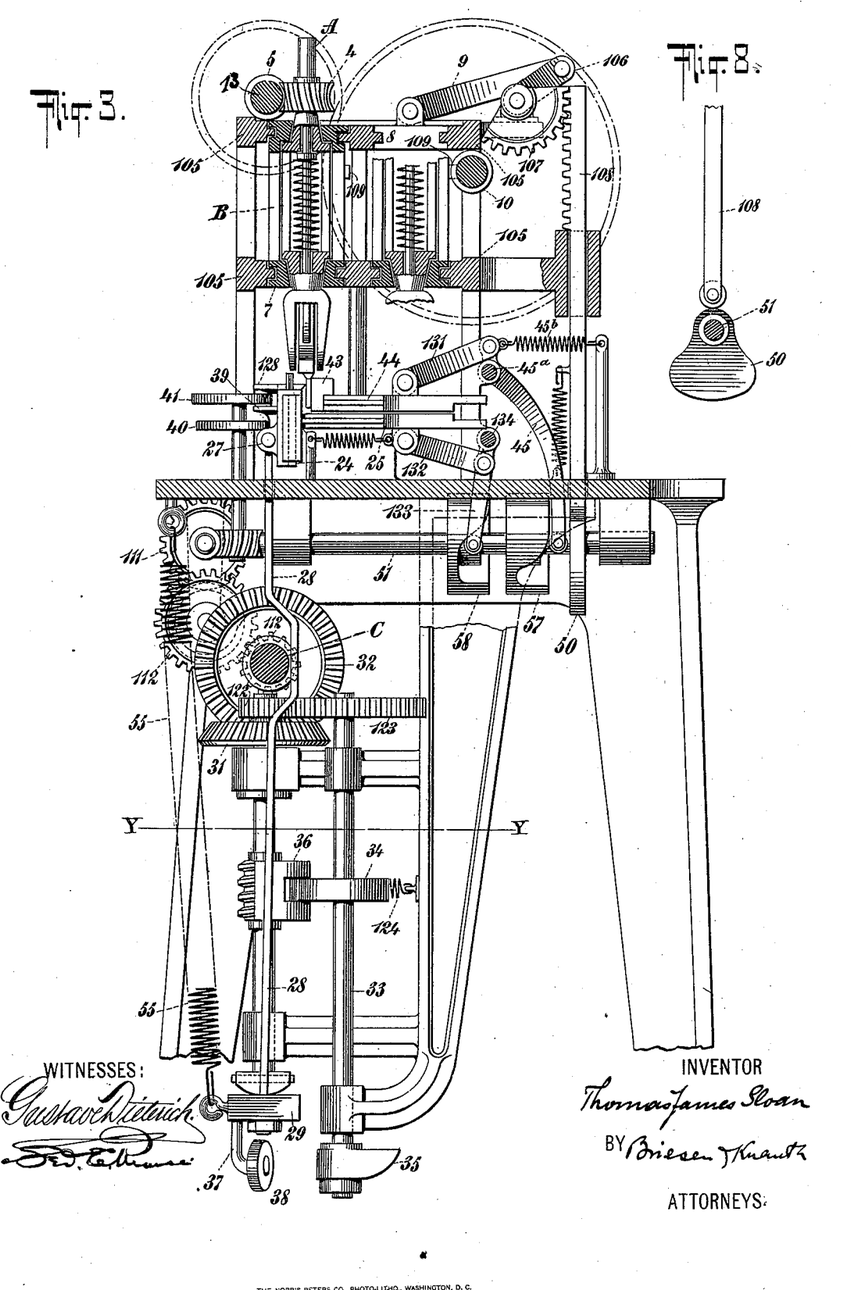
Fig. 3 is a sectional side elevation of the said machine, the section being taken on the line $x\ x$ of Fig. 1ª.
Fig. 8 is a side elevation of a detail of the mechanism.

The carriage 24 is connected by lugs 27, Fig. 1ᵃ, to rods 28, connected at their lower ends by a cross-head 29, apertured to receive the end of a shaft 120, having a collar 121, which bears upon said cross-head 29 and upon which shaft is keyed the lead-worm 30. Motion is imparted to the shaft 120 by a pair of miter-wheels 31 32. The shaft can slide through wheel 31, which is in one piece with a pinion 122, that drives a gear 123, keyed on the cam-shaft 33, Figs. 1ᵃ and 3. The shaft 33 has two cams 34 and 35, of which the former engages the nut 36 on rod 56 with the lead-worm 30 (see Fig. 5) when the tool-holding slide-rest is to be moved downward, and when said slide-rest is at the lower point of its stroke the nut 36 suddenly becomes disengaged from the lead-worm 30 and the tool-holding apparatus is raised by a strong spring 55; but in order to prevent shock by a too sudden return motion the cross-head 29 has a bracket 37, carrying a roller 38, which runs against the lower cam 35, keyed on shaft 33, so as to control the return motion. The nut 36 is constantly pressed against the cam 34 by a spring 124.

Figure 4:
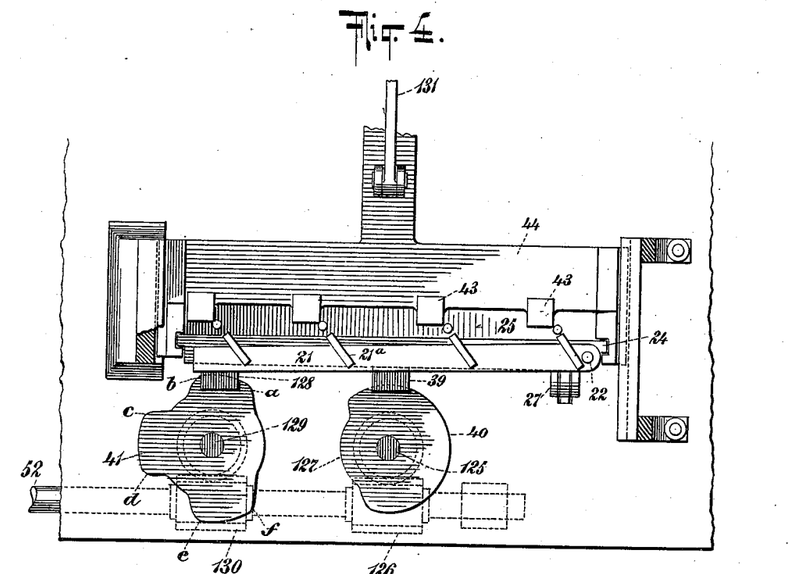
Fig. 4 is a plan view of the screw-cutting tools with the devices for effecting the movement thereof, the section being taken on line Z Z of Fig. 1ª.

The tool-carrying mechanism or carriage carries a steel templet 39, Figs. 1ᵃ and 4, having the exact profile of the lower part of the screw and bearing constantly against the cam 40, which makes a complete revolution at each cut. The cam is provided with a notch 127 to allow of the disengagement of the tool after the cut is terminated. This cam 40 is carried upon a shaft 125, which receives motion from the shaft 52 through suitable intermediate gearing 126. The shaft 52 receives motion from the shaft C by means of gears 111 and 112. The feed of the tool is produced with the aid of an abutment 128 on the tool-rest 21 bearing constantly against a cam 41, Fig. 4, which makes one revolution for every three cutting operations and during a period of cessation of the cutting to permit the removal of the finished screw, insertion of a blank, and motion of the chuck on its rails. The cam 41 is mounted upon a shaft 129, which is driven by the shaft 52 through gearing 130. The cam is divided into four parts. During the first cut the abutment bears upon the part $a\,b$, during the second cut upon the part $c\,d$, during the third upon the part $e\,f$, and during the travel of the part $fa$ over the abutment the operations of pushing the chucks forward, removing the finished screw, and inserting a blank in the chuck at I are performed. The depressions in the cam are for the purpose of allowing the carriage and tool-rest to rise upon the completion of each cut. The tool-holder being pivoted at 22, the forward feed of the tools supported thereby will be the less the nearer a tool is to the pivot 22—that is to say, the nearer the screw is to completion. Opposite each screw being operated upon is a grooved backstay 43, Figs. 3, 4, and 10, to resist the pressure of the tool, these backstays being mounted on a reciprocating slide 44, moved back and forth by a connecting-rod 131 and crank 45, pivoted on a rod $45^a$ and operated by the cam 57 on shaft 51, so as to give passage to the screws when the sliding chucks B are moved along. The spring $45^b$ restores the parts to position. The slide 25, in which the carriage 24 slides vertically, is operated by the link 132, connected to the lever 133, pivoted at 134 to the framing of the machine. A cam 58 on shaft 51 bears on the free end of the lever 133 and transmits motion thereby to the slide 25.

Figure 7:
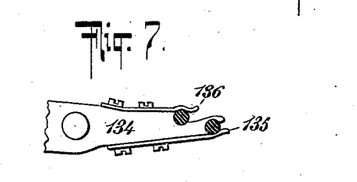
Fig. 7 is an enlarged plan view of the gripper of the carrying mechanism, which gripper is adapted to grasp and hold a screw and a screw-blank at the same time.

The general operation of the tool-moving means just described is as follows: The cam 34 engages the nut 36 in the lead-worm 30, causing its shaft 120, and cross-head 29, rods 28, and also the tool-supporting means 24 to move downward. When the cut is terminated, the slide 25 comes forward and moves the tools out of the work. At the same time that the nut 36 is disengaged and the tool-supporting means rises cam 41 makes one-fourth of a turn, and the second cut is made and then the third. It will of course be understood that the cam 41 is gradually advancing the tool-carriage 24 during this time. During the next or fourth passage of the tools the latter make no cut in order to allow the chucks to be pushed along on the rails 105. The pointing of the screw is effected in the ordinary manner when the blank is placed in the chuck at II. The mechanism represented at the left of Figs. 1 and 2 removes the finished screw from a chuck and replaces it by a screw-blank. This operation is performed with the aid of a double carrier 134, Fig. 7, the finished screw being received by the jaws 135, while the screw-blank is held by the jaws 136. The carrier 134 is mounted on the extremity of a lever 137, turned about a rock-shaft 138 by means of a toothed sector 139 and rack 140. The rock-shaft 138 may receive to-and-fro motion in a longitudinal direction by means of a cam 141 through the jointed-lever connections 142 143 144 145, and the rack 140 may be operated by cam 146 through the suitably-supported jointed-lever connections 147, 148, and 149. The carrier 137 takes the screw-blanks from the lower end 151 of a feed-tube 152, which has a funnel-mouth 153, into which the screw-blanks are dropped one by one with the aid of the following mechanism: The blanks are placed pell-mell in a slowly-revolving tray 154, which is mounted upon a shaft 155, revolved by a gear 156, meshing with a pinion carried upon the shaft $15^a$, which carries the cams 146 and 161 and receives motion from the main shaft C through suitable intermediate gearing, (shown in dotted lines.) A fork 159, pivoted at 160, dips at intervals into the tray 154 and then rises, carrying with it some of the blanks engaged between its members, this movement being produced by a cam 161, rods 162 163, and lever 164, after which fork 159 receives from cam 161 a slight jerking motion, by which the blanks are caused to pass to the point 165, at which is placed a device somewhat resembling the anchor-escapement of a watch 166. The blanks thus pass one by one and drop through a guide 167 into the funnel 153 of tube 152. The oscillatory motion of escapement 166, which regulates the passage of the blanks, is transmitted from cam-shaft $15^a$ by means of a cam 168, (see Fig. 1,) keyed on said shaft, operating on a lever 169, carried on vertical rod 171, the lever 169 having an extension 170, connected to the escapement 166 by a link 172. The rod 171 is stationary, while the cam-shaft $15^a$ and the shaft 155, which carries the tray 154, rotate. The feeding of the screw-threading apparatus is effected, as before mentioned, when a chuck B is in position I, at which moment the feed-arm 137 seizes, by means of the spring carrier-jaws 136, a screw-blank at 151, whereupon the arm is brought by the rack opposite the jaws of the chuck and seizes, by means of the pair of jaws 135, the finished screw, which it withdraws, and inserts the blank in its place, it being understood that the mechanism to open the chuck to release the finished screw is operated at this time. The chuck is closed by the spring 2 when the pressure of the arm 113 is released. The carrier again swings and allows the finished screw to drop into a box provided for the purpose, (not shown,) the operation being then repeated, and so on. Each screw delivered corresponds to one revolution of shaft $15^a$ and one oscillation of escapement 116. Thus every time a blank is seized at 151 one will be supplied by the fork 159.

It is to be understood that the forms, dimensions, and details of arrangement of the various parts constituting this improved machine may be varied without in any way departing from the spirit of my invention.

Having described my invention, what I claim, and desire to secure by Letters Patent, is—

1. In a screw-making machine, the combination of a row of thread-cutting tools arranged in substantially a straight line and operating simultaneously upon separate blanks and means for automatically conveying a procession of blanks in a row before the cutting-tools from one tool to another and for holding the said blanks while they are being cut, so that each blank passes in its holder before the row of tools and is operated upon successively by the several tools.

2. In a machine for threading screws, the combination of a set of cutting-tools with means for causing the same to operate successively upon a screw-blank, one tool making the initial cut and the successive tool or tools working in the cut made by a preceding tool and means for causing the said tools to operate simultaneously upon a series of screw-blanks.

3. In a machine for threading screws, the combination of a plurality of thread-cutting tools arranged in substantially a straight line and located so as to operate successively upon a single blank and simultaneously upon a series of blanks, the first tool making the initial cut and the successive tools working in the cut made by the first tool and means for moving the blanks to the cutting-tools.

4. In a machine for making screws, the combination of a plurality of thread-cutting tools arranged to operate successively upon a single blank and simultaneously upon a series of blanks, the first tool making the initial cut and the successive tools working in the cut made by the first tool, means for automatically moving the blanks to the tools and means for automatically and simultaneously moving the plurality of tools in the direction of the length of the blanks during the cutting operation.

5. In a machine for making screws, the combination of a plurality of cutting-tools arranged to operate successively upon a single blank, the first tool making the initial cut and the successive tools working in the cut made by the first tool, means for automatically moving the blanks to the cutting-tools and means for automatically moving each of the tools toward the work to a different degree from the movement imparted to the other tools whereby the degree of cut made by each tool upon a blank is different from that made by the other tools.

6. In a machine for making screws, the combination of a plurality of cutting-tools arranged to operate successively upon a single blank, the first tool making the initial cut and the successive tools working in the cut made by the first tool, means for automatically moving the blanks to the cutting-tools, means for simultaneously adjusting a plurality of the cutting-tools, means for automatically and simultaneously moving a plurality of tools in the direction of the length of the blanks during the cutting operation and means for automatically moving each of the tools toward the work to a different degree from the movement imparted to the other tools, whereby the degree of cut made by each tool upon a blank is different from that made by the other tools.

7. In a machine for making screws, the combination of a plurality of cutting-tools arranged to operate successively upon a single blank, the first tool making the initial cut and the successive tools working in the cut made by the first tool, means for automatically moving the blanks to the cutting-tools, means for automatically and simultaneously moving the plurality of tools in the direction of the length of the blanks during the cutting operation, means for automatically moving each of the tools toward the work to a different degree from the movement imparted to the other tools, whereby the degree of the cut made by each tool upon a blank is different from that made by the other tools and means for automatically guiding the plurality of cutting-tools laterally with relation to the screw-blanks during the cutting operation to give the profile to the finished screw.

8. In a machine for making screws, the combination of a plurality of screw-blank-holding chucks, mechanism for rotating said chucks, means for automatically placing screw-blanks in said chucks and for removing finished screws therefrom, a plurality of thread-cutting tools arranged in a straight line and located so as to operate successively upon a single blank, the first of said tools producing the initial cut and successive tools working in the cut made by the first tool, mechanism for automatically moving the chucks to the cutting-tools, devices for simultaneously moving all the said tools in the direction of the length of the blanks during the cutting operation, mechanism for automatically moving each of said tools toward the work to a different degree from the movement imparted to the other tools, whereby the degree of cut made by each tool upon a blank is different from that made by the other tools and means for automatically guiding the plurality of thread-cutting tools laterally with relation to the screw-blanks during the cutting operation to give the profile to the finished screws.

9. In a screw-making machine, the combination of a series of thread-cutting tools arranged in a row, a row of traveling rotating chucks carrying blanks to be operated upon by the screw-thread-cutting tools, and means for causing the tools and blanks to be engaged with each other at predetermined times, the said tools operating simultaneously upon separate blanks and means for producing a forward movement or progression of the chucks at predetermined times to transfer the chucks carrying blanks to the next tool of the series, whereby each blank will be operated upon successively by the successive tools and a series of blanks will be operated upon simultaneously by the series of tools, substantially as described and for the purposes set forth.

10. In a screw-making machine, the combination of a series of moving rotating chucks, a series of thread-cutting tools in operative relation to the said chucks and fixed with respect to the movement of translation thereof, means for causing the said tools to operate upon a series of blanks carried in the said chucks simultaneously and means for interrupting the operation of the tools and feeding the chucks forward during the inactive period of the said tools, whereby each blank will be operated upon in turn by the row of tools, the said tools operating simultaneously upon a series of blanks.

11. In a screw-making machine, the combination of blank-carrying devices with means for causing the same to travel in substantially a straight line, of a series of thread-cutting tools arranged in substantially a straight line in operative relation to the blank-carrying devices, means for effecting the engagement of tools and blanks for the thread-cutting operation, means for interrupting such operation and means for feeding the blank-carrying devices forward when the thread-cutting devices are out of operation, whereby each screw in the procession is operated upon by each tool and a plurality of blanks are operated upon simultaneously by a plurality of tools.

12. In a screw-making machine, the combination of a procession of movable screw-blank-carrying devices, a series of tools in operative relation to said screw-blank-carrying devices to operate upon blanks carried by the said screw-blank-carrying devices and stationary with respect to the motion of translation of the blanks, a common swinging carrier carrying the said tools and means for producing a swing of the carrier and for allowing a progression of the screw-blank-carrying devices when the tools have been moved away from the work, whereby each screw is operated upon successively by the series of tools and a series of tools operate simultaneously upon a series of screw-blanks.

13. In a screw-making machine, the combination of a procession of independent rotating screw-blank-carrying devices traveling on rails or guides, a plurality of thread-cutting tools arranged to operate upon screw-blanks carried by the procession of screw-blank-carrying devices, combined with operating means for causing the said tools to operate successively upon a single blank, the first tool making the initial cut and successive tools working in the cut made by the first tool.

14. In a screw-making machine, the combination of rails or guides, a procession of independent movable screw-blank carriers traveling on said rails with means for causing a progressive movement of the said screw-blank carriers on the rails or guides, a series of cutting-tools arranged to operate successively upon a single blank as the same is presented to the tools successively, one tool making the initial cut and successive tools working in the cut made by the first tool and means for automatically moving the blanks to the cutting-tools.

15. In a screw-making machine, the combination of rails or guides, a series of rotating chucks carried by said rails or guides, screw-thread cutters for cutting blanks carried by said chucks and means for causing an intermittent progressive movement of the said chucks past the tools.

16. The combination of the guides, the chucks moving thereon, means for rotating the chucks, thread-cutting means and means for alternately operating the cutting means and moving the chucks forward on the guides.

17. The combination of guides or rails forming a closed path or circuit, blank-carrying chucks moving thereon, means for moving the chucks on the guides or rails and screw-cutting means in the path of the blanks.

18. In a screw-making machine, the combination of a series of screw-blank carriers with means for causing a movement of translation thereof, a series of thread-cutting tools in positions fixed with respect to the movement of translation of the carriers, and means for intermittently moving the carriers over spaces equal to the distance between adjacent thread-cutting tools, whereby blanks are operated upon successively by the successive tools and a series of blanks carried by the carriers is operated upon simultaneously by the series of tools.

The foregoing specification of my improvements in screw-making machines signed by me this 5th day of April, 1897.

THOMAS JAMES SLOAN.

Witnesses:
   EDWARD P. MACLEAN,
   MAURICE HENRI PIGNET.